United States Patent Office.

JACOB SHELLER, OF WILMINGTON, DELAWARE.

Letters Patent No. 82,254, dated September 15, 1868.

IMPROVED COMPOSITION FOR STUFFING AND FILLING WOOD.

*The Schedule referred to in these Letters Patent and making part of the same.*

TO ALL WHOM IT MAY CONCERN:

Be it known that I, JACOB SHELLER, of Wilmington, New Castle county, and State of Delaware, have invented an Improved Composition for Filling the Pores of Wood previous to polishing, varnishing, or oiling, of which I declare the following to be an exact description.

I take one (1) pound of starch, one (1) pound of concentrated ammonia, one (1) pint of linseed-oil, one (1) pint of japan varnish, and one (1) ounce of sugar of lead.

I first mix the starch and ammonia until they become a thick paste, and then add the other ingredients.

I apply this composition with an ordinary varnish-brush to the surface of the wood to be varnished or oiled. I then let it have sufficient time, say ten or fifteen minutes, to set itself into the wood, so as to fill up the pores completely, after which, on a flat surface, I use a scraper, to save the unabsorbed composition; but on a round surface, I use a rag or shavings, so as to leave nothing but what is in the pores of the wood. In this way I save one-third varnish and one-half the labor now required in varnishing, and by this composition I can impart various shades to the wood by increasing or decreasing the quantity of ammonia. I then let it remain for about six hours, to become firm and smooth, so as to receive a light coat of varnish.

The advantages of these several ingredients are, viz:

The oil is to give a surface to the wood, to prevent the fibres or grain from peeling, and to give the operator a chance to work the composition on the wood. The japan helps the composition to dry, and the sugar of lead to harden it.

The object is to save one-third of varnish commonly used in varnishing fine work, say, finishing of pianos, inside of cars, or in all kinds of work, and much labor saved in not having to rub the varnish down between each coat, so as to get a fine polish, as is usually the case.

The number of coats of varnish on a piano are from ten to twelve, whilst with my composition three or four coats produce the same effect and finer polish.

Instead of turpentine and arrow-root, as claimed in my patent of June 2, 1868, I now use starch and ammonia, thereby dispensing with the necessity of grinding, which is a considerable improvement on my said former patent.

What I claim as my invention, and desire to secure by Letters Patent, is—

The combination of the within-named ingredients, when mixed in the several quantities and proportions as herein described, and for the purpose set forth.

JACOB SHELLER.

Witnesses:
HENRY GREBE,
JOSEPH STOECKLE.